United States Patent
Yoshida (10) Patent No.: US 8,103,158 B2
(45) Date of Patent: Jan. 24, 2012

(54) IMAGE SENSING APPARATUS AND CONTROL METHOD THEREOF

(75) Inventor: Daisuke Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/860,052

(22) Filed: Aug. 20, 2010

(65) Prior Publication Data

US 2011/0052173 A1   Mar. 3, 2011

(30) Foreign Application Priority Data

Aug. 31, 2009 (JP) ................. 2009-201091

(51) Int. Cl.
G03B 3/10 (2006.01)
(52) U.S. Cl. .................. 396/121; 396/213; 348/362
(58) Field of Classification Search .......... 396/121–122, 396/213, 234; 348/208.12, 362, 364
See application file for complete search history.

(56) References Cited

U.S. PATENT DOCUMENTS

| 4,796,043 | A | * | 1/1989 | Izumi et al. .................. 396/121 |
| 5,319,416 | A | * | 6/1994 | Takagi ......................... 396/233 |
| 5,640,625 | A | * | 6/1997 | Hozumi ........................ 396/265 |
| 5,860,032 | A | * | 1/1999 | Iwane ........................... 396/125 |
| 6,144,804 | A | * | 11/2000 | Inoue ............................ 396/234 |
| 2008/0089616 | A1 | * | 4/2008 | Gwak ........................... 382/309 |
| 2008/0199174 | A1 | * | 8/2008 | Yoshida ........................ 396/257 |
| 2009/0315997 | A1 | * | 12/2009 | Ogasawara et al. ........... 348/169 |

FOREIGN PATENT DOCUMENTS

JP  2001-356384  12/2001

* cited by examiner

Primary Examiner — Christopher Mahoney
(74) Attorney, Agent, or Firm — Cowan, Liebowitz & Latman, P.C.

(57) ABSTRACT

In continuous shooting processing, the defocus amounts of respective focus detection areas and the reliabilities of the defocus amounts are detected from information of the focus detection areas. Weightings are determined based on the reliabilities and defocus amounts. If the detection of defocus amounts is not completed in one shooting operation during continuous shooting, weightings are determined using defocus amounts detected in a shooting operation preceding the current one during continuous shooting. If there is no defocus amount that has been detected in a shooting operation preceding the current one, weightings are determined to weight a photometry area at a predetermined position of the field. A correct exposure for shooting is determined by calculating the weighted average of photometric values obtained in a plurality of photometry areas using the determined weightings. Continuous shooting can be performed with a correct exposure without decreasing the continuous shooting speed.

6 Claims, 6 Drawing Sheets

|  |  |  |  |  |  |  |
|--|--|--|--|--|--|--|
|  |  |  |  |  |  |  |
|  |  |  | AF1 |  |  |  |
|  |  | AF2 |  | AF3 |  |  |
|  | AF4 |  | AF5 |  | AF6 |  |
|  |  | AF7 |  | AF8 |  |  |
|  |  |  | AE9 |  |  |  |
|  |  |  |  |  |  |  |

F I G. 2B

| AE11 | AE12 | AE13 | AE14 | AE15 | AE16 | AE17 |
|------|------|------|------|------|------|------|
| AE21 | AE22 | AE23 | AE24 | AE25 | AE26 | AE27 |
| AE31 | AE32 | AE33 | AE34 | AE35 | AE36 | AE37 |
| AE41 | AE42 | AE43 | AE44 | AE45 | AE46 | AE47 |
| AE51 | AE52 | AE53 | AE54 | AE55 | AE56 | AE57 |
| AE61 | AE62 | AE63 | AE64 | AE65 | AE66 | AE67 |
| AE71 | AE72 | AE73 | AE74 | AE75 | AE76 | AE77 |

IMAGE SENSING APPARATUS AND CONTROL METHOD THEREOF

BACKGROUND OF THE INVENTION

1. Field of the Invention

The present invention relates to an image sensing apparatus that has a plurality of focus detection areas and performs exposure control using the defocus amounts of the plurality of focus detection areas.

2. Description of the Related Art

Some image sensing apparatus such as a digital camera and digital video camera have an auto-focus function of determining whether an object is in focus, and driving a focus lens to focus on the object. Auto-focus methods include a phase difference detection method. In the phase difference detection method, the object image is divided by pupil division, obtaining two images. The defocus amount of the object is detected from the phase difference between the two images. Based on the detected defocus amount, the focus lens in the photographing optical system is moved to focus on the object.

Some image sensing apparatus have an auto-exposure function of measuring the brightness of an object and determining a correct exposure when sensing an object image. The exposure is determined based on the photometric value of an object and the sensitivity (or equivalence) of the image sensing apparatus. Upon determining the exposure, the aperture and shutter speed are changed in accordance with a necessary exposure, and an image can be sensed with a correct exposure.

When the image sensing apparatus has both the auto-focus and auto-exposure functions, it measures the brightness of an object in an in-focus object image area detected by the auto-focus function. The image sensing apparatus can focus on the object and sense its image with a correct exposure. Japanese Patent Laid-Open No. 2001-356384 discloses a technique of obtaining a correct exposure. In this technique, weightings are determined in accordance with the defocus amounts of a plurality of focus detection areas. The weighted average of the photometric values of the focus detection areas is calculated using the weightings, thereby calculating the photometric value of all the areas.

However, when the technique of obtaining a correct exposure in Japanese Patent Laid-Open No. 2001-356384 is applied to continuous shooting, the continuous shooting speed may decrease because the calculation of defocus amounts takes time. To prevent this, priority may be given to the continuous shooting speed, and image sensing may be done regardless of whether the calculation of defocus amounts has been completed. However, among images obtained in continuous shooting, the exposure may differ between an image obtained by performing exposure control using defocus amounts and one obtained by performing exposure control without using defocus amounts.

SUMMARY OF THE INVENTION

The present invention has been made to solve the conventional problems. The present invention provides an image sensing apparatus which has a plurality of focus detection areas, performs exposure control using the defocus amounts of the plurality of focus detection areas, and can achieve continuous shooting with a correct exposure without decreasing the continuous shooting speed.

The present invention in its first aspect provides an image sensing apparatus capable of continuous shooting, comprising: a defocus amount detection unit which detects a defocus amount in each of a plurality of focus detection areas in every shooting operation during continuous shooting; a photometry unit which has a plurality of photometry areas corresponding to the plurality of focus detection areas and performs photometry in each of the plurality of photometry areas in every shooting operation during continuous shooting; a weighting unit which determines a weighting of each of the plurality of photometry areas based on defocus amounts detected by the defocus amount detection unit; and an exposure determination unit which determines an exposure for image sensing in every shooting operation during continuous shooting, wherein in one shooting operation during continuous shooting, when the weighting unit can determine weightings of the plurality of photometry areas till a next successive shooting operation, the exposure determination unit determines the exposure by calculating a weighted average of photometric values of the plurality of photometry areas using the weightings determined by the weighting unit, and when the weighting unit cannot determine the weightings of the plurality of photometry areas till the next successive shooting operation, the exposure determination unit determines the exposure by calculating a weighted average of the photometric values of the plurality of photometry areas using weightings which have been determined by the weighting unit in a shooting operation preceding the one shooting operation.

Further features of the present invention will become apparent from the following description of exemplary embodiments with reference to the attached drawings.

DESCRIPTION OF THE EMBODIMENTS

A preferred embodiment of the present invention will be described in detail below with reference to the accompanying drawings. In the following embodiment, the present invention is applied to a phase difference detection type auto-focus function as an example of an image sensing apparatus.

Figure 1:
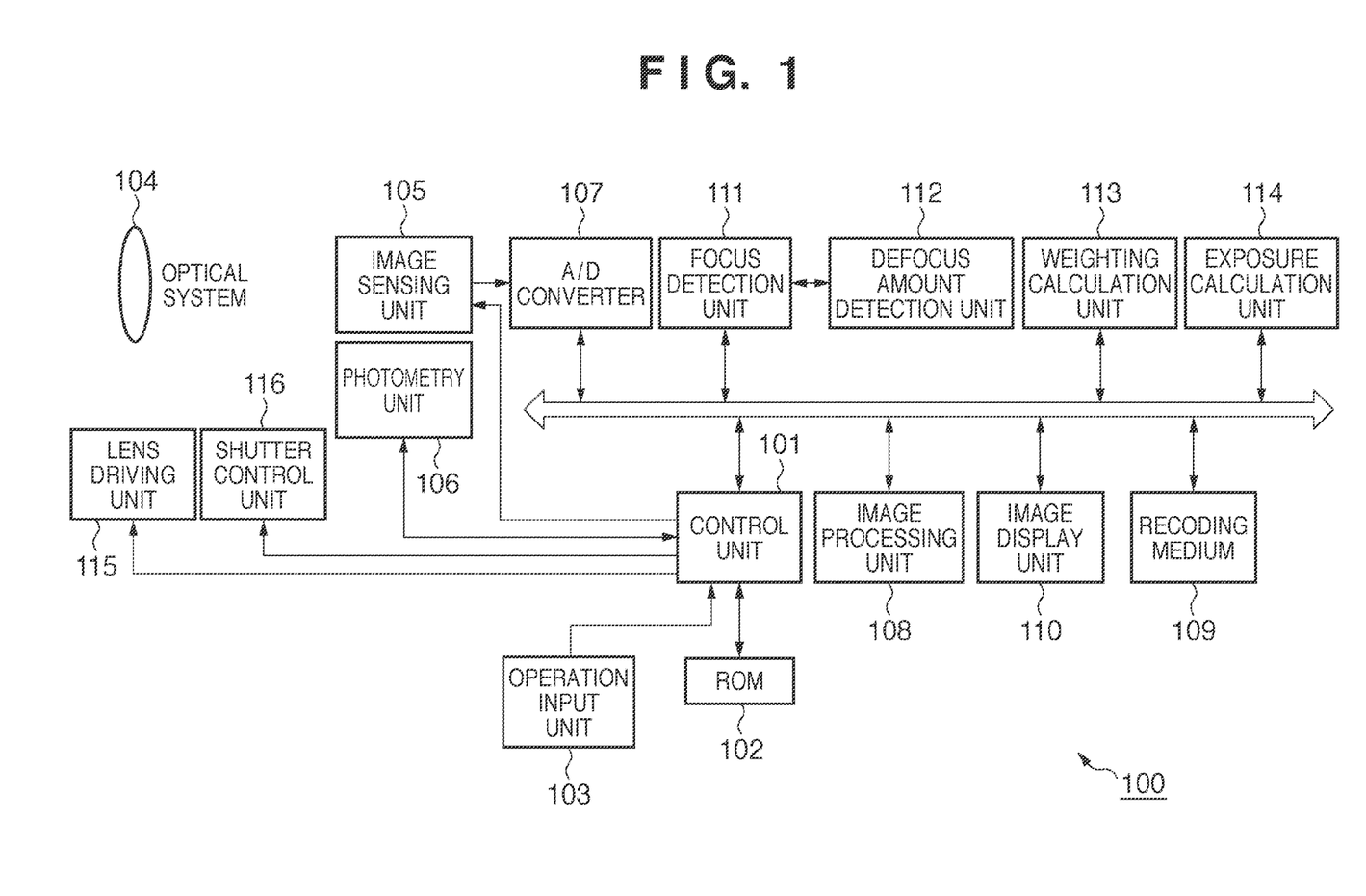
FIG. 1 is a block diagram showing the functional arrangement of an image sensing apparatus according to an embodiment of the present invention.

FIG. 1 is a block diagram showing the functional arrangement of the digital camera according to the embodiment of the present invention.

A control unit 101 is, for example, a CPU and controls the operation of each block of a digital camera 100. The control unit 101 loads a program which is stored in, for example, a ROM 102 (to be described later) to operate each block of the digital camera 100. The control unit 101 expands the program in a RAM (not shown), and controls the operation of each block. The control unit 101 determines a shutter speed and aperture value in accordance with an exposure calculated by an exposure calculation unit 114 (to be described later), and transmits them to a lens driving unit 115 and shutter control unit 116 (both of which will be described later). The ROM 102 is, for example, a rewritable nonvolatile memory. In addition to the operation program of each block of the digital camera 100, the ROM 102 stores information on the recording pixel count of a sensed image, and information on image sensing indicating whether to use the continuous shooting mode. An operation input unit 103 provides user interfaces of the digital camera 100 such as a power button and release button. The operation input unit 103 accepts a manipulation from the user to each button, and notifies the control unit 101 that the input has been accepted.

Figure 2A:
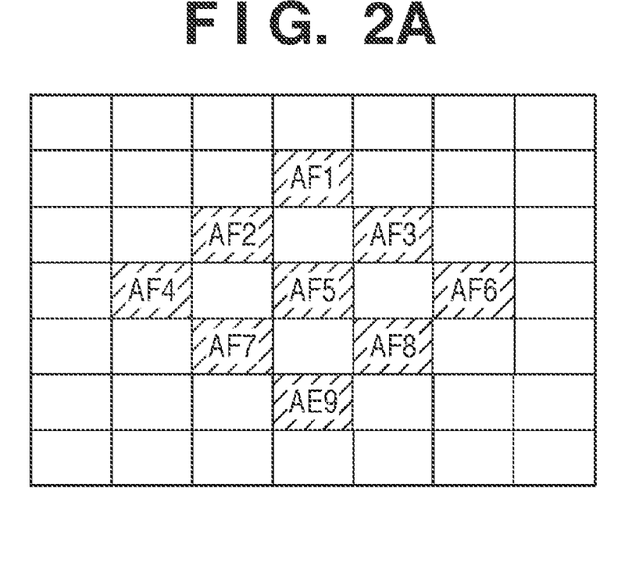
FIGS. 2A and 2B are views for explaining the principles of focus detection and photometry.
Figure 2B:
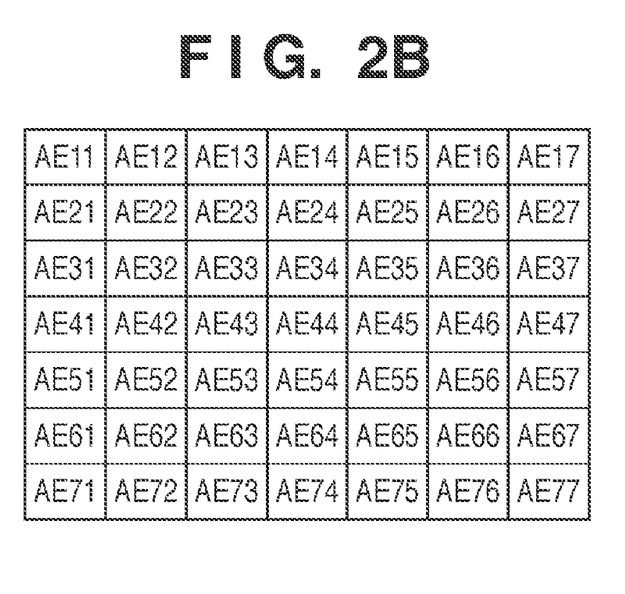

An optical system 104 includes, for example, lenses such as a focus lens and zoom lens, an aperture, and a shutter. The optical system 104 captures light reflected by an object into the digital camera 100. An image sensing unit 105 is, for example, an image sensor such as a CCD sensor or CMOS sensor. The image sensing unit 105 photoelectrically converts an object image which is captured and formed by the digital camera 100 via the optical system 104, and outputs the obtained analog image signal to an A/D converter 107. A photometry unit 106 is, for example, a photometry sensor arranged at a position optically conjugate to the image sensing unit 105. For each of areas obtained by dividing the field, the photometry unit 106 acquires information of a photometric value (luminance) from light that has been reflected by the object and entered the digital camera 100 via the optical system 104, and outputs it to the control unit 101. FIG. 2B is a view exemplifying areas subjected to photometry by the photometry sensor of the photometry unit 106. In FIG. 2B, photometric values can be acquired for 49 divided photometry areas. The A/D converter 107 A/D-converts an analog image signal input from the image sensing unit 105, outputting digital image data. An image processing unit 108 applies various image processes such as resolution conversion and color tone conversion to the digital image data output from the A/D converter 107, and records the resultant image data on a recoding medium 109 to be described next. The recoding medium 109 is, for example, a recording storage area ensured in the digital camera 100, or a removable recording medium connected to the digital camera 100, such as a memory card or HDD. An image display unit 110 is, for example, a display device such as a compact LCD, and sequentially displays object images output from the image sensing unit 105 (through display). The image display unit 110 functions as an electronic viewfinder using through display. In addition, the image display unit 110 displays a GUI for setting the digital camera 100, and an image recorded on the recording medium.

A focus detection unit 111 detects the phase difference between two images obtained by pupil division via an optical system (not shown) for a plurality of focus detection areas on the field, and outputs it to a defocus amount detection unit 112. By using defocus amounts detected by the defocus amount detection unit 112, the focus detection unit 111 calculates a focus lens position where the object is in focus in one of focus detection areas. FIG. 2A is a view exemplifying a plurality of focus detection areas where the focus detection unit 111 detects the phase difference between two images obtained by pupil division. In FIG. 2A, nine hatched areas are set as focus detection areas used in focus detection. In FIGS. 2A and 2B, for example, a focus detection area AF5 and a photometry area AE44 are identical on the field. For each focus detection area, a corresponding photometry area exists. As will be described later, each photometry area is weighted based on the defocus amount of a corresponding focus detection area.

By using contrast information of an image formed on a focus detection sensor arranged in the focus detection unit 111, the focus detection unit 111 determines the reliabilities of the defocus amounts of the focus detection areas, and outputs them to the ROM 102. Then, the ROM 102 stores the reliabilities. Note that the reliability is the degree of accuracy of a defocus amount detected by the defocus amount detection unit 112. As the contrast of an image formed on the focus detection sensor is higher, the influence of noise on an output from the focus detection sensor becomes smaller, and the reliability of the defocus amount becomes higher.

The defocus amount detection unit 112 calculates a defocus amount from the phase difference between two images that has been detected by the focus detection unit 111, and outputs the calculated defocus amount to a weighting calculation unit 113. The weighting calculation unit 113 determines the weightings of corresponding photometry areas, based on information of the reliabilities of the focus detection areas that have been determined by the focus detection unit 111, and information of the defocus amounts of the focus detection areas that have been detected by the defocus amount detection unit 112. For example, the weighting is increased for a photometry area corresponding to a focus detection area where the defocus amount is small, that is, defocusing is small, and decreased for a photometry area corresponding to a focus detection area where the defocus amount is large, that is, defocusing is large. The weighting is increased for a photometry area corresponding to a focus detection area where it can be determined that the reliability is higher than a given threshold, that is, the defocus amount is accurate. Similarly, the weighting is decreased for a photometry area corresponding to a focus detection area where it can be determined that the reliability is equal to or lower than the given threshold, that is, the defocus amount is not accurate. That is, the weighting calculation unit 113 sets the weighting of each photometry area so that it becomes high for a photometry area corresponding to a focus detection area where the reliability is high and the defocus amount is small. The weighting calculation unit 113 stores information of the weighting of each photometry area in the ROM 102 via the control unit 101.

The exposure calculation unit 114 performs the following calculation using, for example, information of the photometric values of photometry areas corresponding to a plurality of focus detection areas, out of the multiple divided photometry areas of the photometry unit 106. The exposure calculation unit 114 calculates the weighted average of the photometric values of the photometry areas corresponding to a plurality of focus detection areas in accordance with information of the weightings stored in the ROM 102, thereby calculating a weighted average photometric value to be set as the photometric value of all the areas. The exposure calculation unit 114 determines a correct exposure based on information of the calculated weighted average photometric value, and transmits the information of the exposure to the control unit 101. The lens driving unit 115 drives the focus lens of the optical system 104 in accordance with information of the focus lens position where the object is in focus, which has been detected by the focus detection unit 111. The lens driving unit 115 receives information of the exposure determined by the exposure calculation unit 114, and drives the aperture of the optical system 104 in accordance with information of the aperture value determined by the control unit 101. The shutter control unit 116 receives information of the exposure determined by the exposure calculation unit 114, and drives the shutter of the optical system 104 in accordance with information of the shutter speed determined by the control unit 101.

Figure 3:
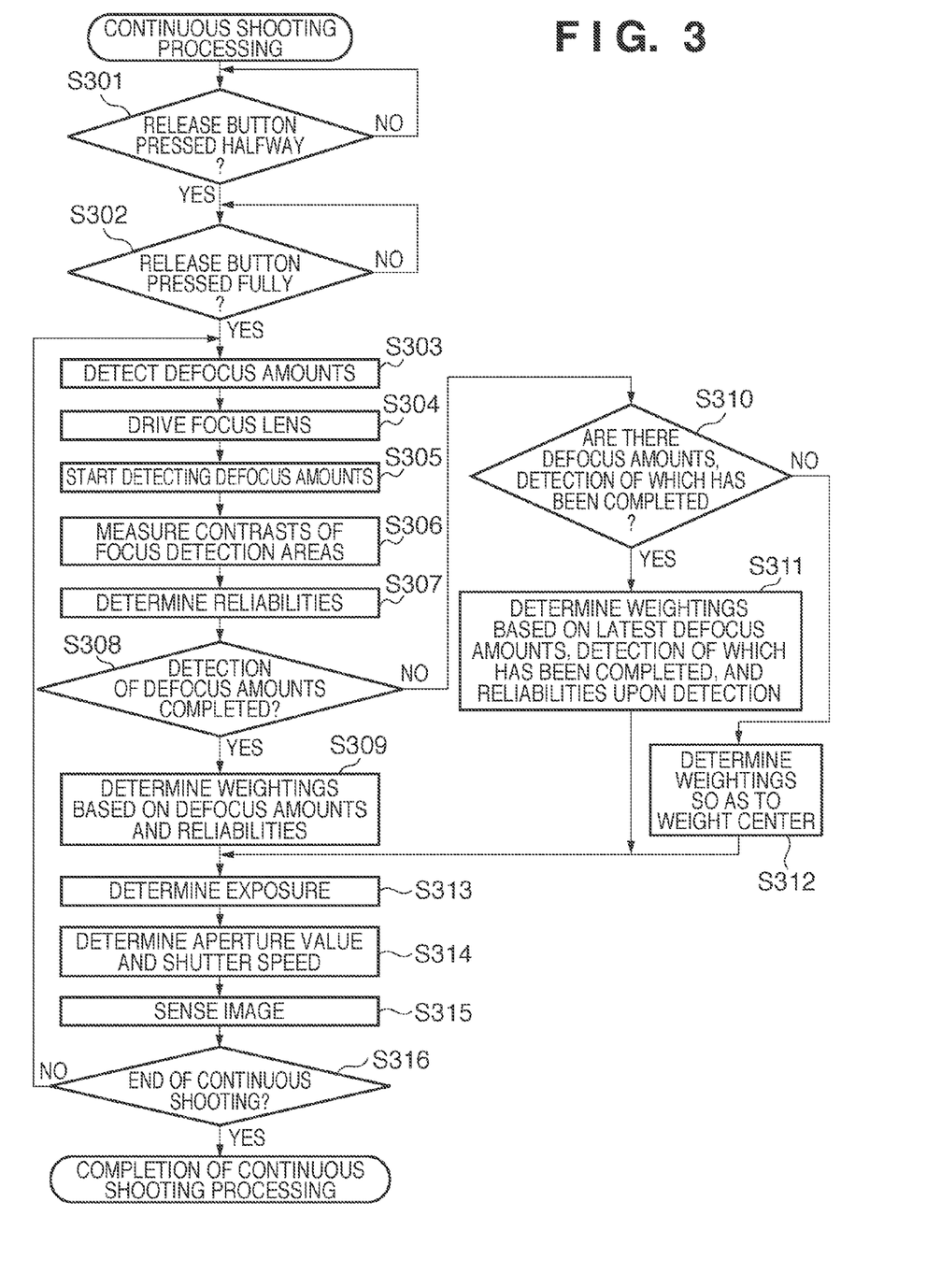
FIG. 3 is a flowchart for explaining continuous shooting processing in the image sensing apparatus according to the embodiment.

Continuous shooting processing in the digital camera having this arrangement in the embodiment will be further explained with reference to the flowchart of FIG. 3. The embodiment assumes that the continuous shooting mode is set in image sensing settings of the digital camera 100 that are stored in the ROM 102.

Upon receiving an input from the user to the power button of the operation input unit 103, the control unit 101 activates the digital camera 100, and starts the operation of each block of the digital camera 100. In step S301, the control unit 101 determines whether the user has pressed the release button of the operation input unit 103 halfway. If the user has pressed the release button of the operation input unit 103 halfway, the focus detection unit 111 splits, by pupil division, light that has traveled from the object and entered the digital camera 100 via the optical system 104. The split light beams then enter the focus detection sensor (not shown). The control unit 101 suspends the process in step S301 until the user has pressed the release button of the operation input unit 103 halfway.

In step S302, the control unit 101 starts continuous shooting processing upon receiving an input in response to fully pressing the release button of the operation input unit 103 by the user. Note that the embodiment assumes that the user keeps pressing the release button of the operation input unit 103 during continuous shooting processing. For example, every time one shooting operation during continuous shooting has ended, the control unit 101 determines in step S314 whether the input from the user to the release button of the operation input unit 103 continues. After the start of the continuous shooting processing, the control unit 101 shifts the process to step S303.

In step S303, the control unit 101 instructs the focus detection unit 111 to detect a defocus amount of each of the plurality of focus detection areas. The focus detection unit 111 causes the defocus amount detection unit 112 to calculate a defocus amount of each of the plurality of focus detection areas. Upon completion of calculating defocus amounts by the defocus amount detection unit 112, the control unit 101 shifts the process to step S304.

In step S304, the control unit 101 instructs the focus detection unit 111 to calculate, based on information of the defocus amounts obtained in step S304, a focus lens position where the object is in focus in one of focus detection areas. In accordance with information of the focus lens position where the object is in focus, which has been calculated by the focus detection unit 111, the control unit 101 instructs the lens driving unit 115 to drive the focus lens to the position where the object is in focus. After driving the focus lens to the position where the object is in focus, the control unit 101 shifts the process to step S305. Note that, which focus detection area is intended for the object focusing operation may be selected based on an input from the user to the operation input unit 103, or determined by automatically selecting, by the control unit 101, a focus detection area where a principal object determined by known principal object determination processing exists.

In step S305, the control unit 101 instructs the focus detection unit 111 to start calculating a defocus amount of each of the plurality of focus detection areas after the focusing operation. At this time, the control unit 101 shifts the process to step S308 even during the calculation upon the lapse of a predetermined time after the defocus amount detection unit 112 starts calculating the defocus amounts. The predetermined time is determined in proportion to information of a time (continuous shooting speed) assigned to one shooting operation in continuous shooting. This information is included in, for example, image sensing settings stored in the ROM 102. For example, when continuous shooting is set to perform five shooting operations per sec, the time assigned to one shooting operation is 0.2 sec. However, one shooting operation includes times necessary for the processes of other steps, so the "predetermined time" in this step is set to, for example, 0.02 sec which is shorter than 0.2 sec.

In step S306, the control unit 101 instructs the focus detection unit 111 to detect contrast information of the focus detection sensor for each of the plurality of focus detection areas. It suffices to start this step together with the start of defocus amount detection in step S305 after the focusing operation. The control unit 101 parallel-executes the processes in steps S305, S306, and S307. As described in step S305, the control unit 101 shifts the process to step S308 upon the lapse of a predetermined time after the start of calculating the defocus amounts. At this time, the value of the predetermined time is determined to complete the processes up to step S307 (to be described below).

Figure 6A:
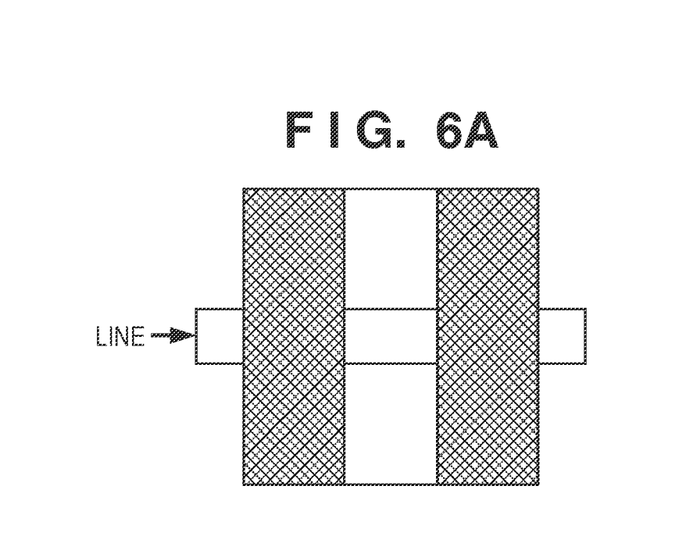
FIGS. 6A, 6B, 6C, and 6D are views for explaining an example of a reliability determination method.
Figure 6B:
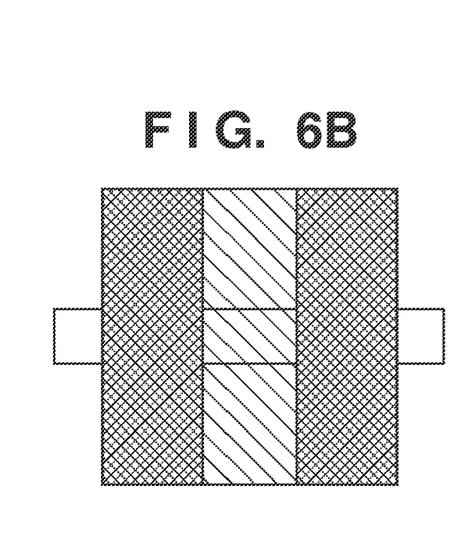
Figure 6C:
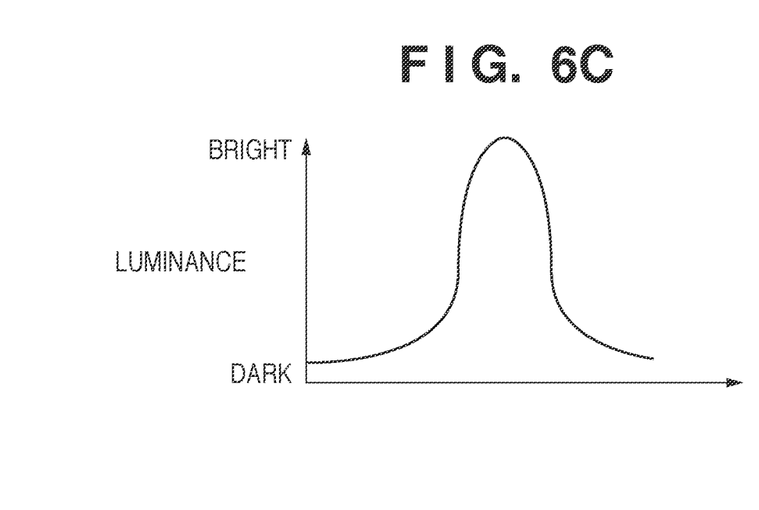
Figure 6D:
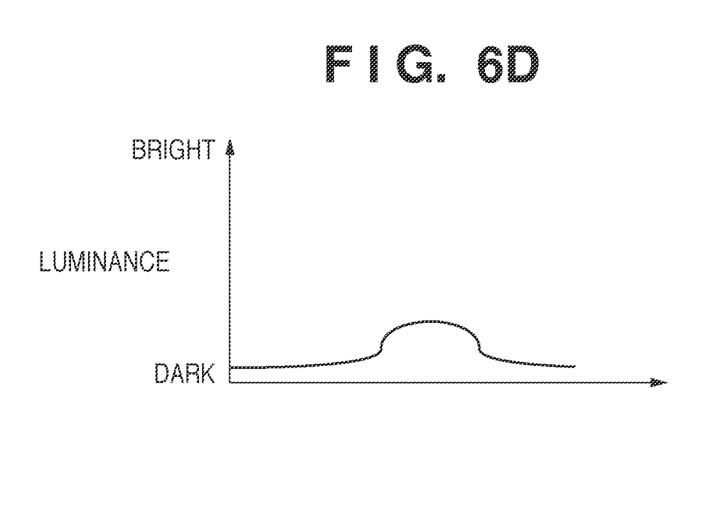

In step S307, the control unit 101 instructs the focus detection unit 111 to determine the reliabilities of the respective focus detection areas by using the contrast information of the focus detection sensor that have been detected by the focus detection unit 111 in step S306 for the respective focus detection areas. A method of determining the reliability of the defocus amount of the focus detection area will be exemplified with reference to FIGS. 6A to 6D. When the focus detection unit 111 detects contrast information of the focus detection sensor for each focus detection area, the control unit 101 obtains contrast information of each focus detection area from, for example, the average of the luminance differences between adjacent pixels on each horizontal line of a digital image. FIGS. 6A and 6B are views schematically showing a high-contrast digital image and low-contrast one, respectively. In the high-contrast digital image of FIG. 6A, luminance information of adjacent pixels on a horizontal line shown in FIG. 6A is, for example, one as shown in FIG. 6C. In the low-contrast digital image of FIG. 6B, luminance information of adjacent pixels on a horizontal line shown in FIG. 6B is, for example, one as shown in FIG. 6D. A comparison between FIGS. 6C and 6D reveals that the luminance difference between adjacent pixels on a horizontal line is larger in FIG. 6C showing luminance information of the high-contrast image. Since dark and bright image portions can be clearly discriminated in a high-contrast image, it can be determined that the high-contrast image is hardly affected by noise and the reliability of an obtained defocus amount is high. That is, the reliability of the defocus amount is high for high-contrast information. For this reason, the reliability defined in the embodiment is determined based on the average (included in contrast information) of the luminance differences between adjacent pixels of the focus detection sensor in a focus detection area having the maximum value of the luminance difference. The focus detection unit 111 outputs, to the ROM 102, information of the reliabilities of the focus detection areas that have been determined in accordance with an instruction from the control unit 101. The ROM 102 stores the information.

In step S308, the control unit 101 determines whether the calculation of the defocus amounts that has been started by the defocus amount detection unit 112 in step S305 has been completed. If the calculation of the defocus amounts has been completed, the control unit 101 shifts the process to step S309. At this time, the defocus amount detection unit 112 outputs, to the weighting calculation unit 113 via the focus detection unit 111, the defocus amounts (detection results) of the focus detection areas that have been calculated in accordance with an instruction from the control unit 101.

In step S309, the control unit 101 transmits, to the weighting calculation unit 113, information of the reliabilities that have been determined by the focus detection unit 111 and stored in the ROM 102. The control unit 101 instructs the weighting calculation unit 113 to calculate the weightings of the respective focus detection areas from information of the reliabilities determined by the focus detection unit 111, and information of the defocus amounts output from the defocus amount detection unit 112. Further, the control unit 101 stores, in the ROM 102, information of the weightings determined by the weighting calculation unit 113, and information of the defocus amounts and reliabilities used to determine the weightings. Thereafter, the control unit 101 shifts the process to step S313.

For example, the absolute values $|\delta|$ of the defocus amounts as the detection results of the defocus amount detection unit 112 are classified into ranges of $|\delta| \leq 25$ μm, 25 μm$< |\delta| \leq 50$ μm, 50 μm$< |\delta| \leq 100$ μm, and 100 μm$< |\delta|$, and weightings are determined for the respective ranges. In this case, for example, the weightings are set to 1, 0.75, 0.5, and 0.25. Further, when the reliability is higher than, for example, 75%, the weighting determined based on the absolute value of the defocus amount is changed by quadruplicating it. Accordingly, a heavy weighting is applied to a focus detection area where the reliability is high and the defocus amount is small. As an example of the method of determining the weighting, defocus amounts are classified into predetermined ranges, and weightings are determined for the respective ranges. When the reliability is higher than a threshold, the weighting is corrected by multiplying it by a predetermined numerical value. However, the weighting determination method is not limited to this. For example, the weighting may be determined by multiplying, by a predetermined numerical value, the reciprocal of the absolute value of the defocus amount that is inversely proportional to the absolute value of the defocus amount. Alternatively, the weighting may be determined to be larger for higher reliability than that for lower one, without classifying the reliability by a threshold.

If the calculation of the defocus amounts has not been completed in step S308, the control unit 101 shifts the process to step S310. In step S310, the control unit 101 determines whether there are defocus amounts, calculation of which has been started by the defocus amount detection unit 112 after the focusing operation and completed in a shooting operation preceding the current one during continuous shooting. If there are defocus amounts, calculation of which has been started by the defocus amount detection unit 112 after the focusing operation and completed in a shooting operation preceding the current one, the control unit 101 shifts the process to step S311.

In step S311, the control unit 101 outputs, to the weighting calculation unit 113, defocus amounts calculated in the latest shooting operation among those, calculation of which has been started by the defocus amount detection unit 112 after the focusing operation and completed in shooting operations preceding the current one. Also, the control unit 101 reads out, from the ROM 102, information of reliabilities determined in the latest shooting operation for defocus amounts, calculation of which has been started by the defocus amount detection unit 112 after the focusing operation and completed in a shooting operation preceding the current one. Then, the control unit 101 outputs the readout information to the weighting calculation unit 113. Defocus amounts calculated in the latest shooting operation among those, calculation of which has been started by the defocus amount detection unit 112 after the focusing operation and completed in shooting operations preceding the current one, and reliabilities obtained in this shooting operation may be referred to in the following way.

If the defocus amount detection unit 112 has not completed the calculation of defocus amounts in a preceding shooting operation that has started in step S305 in accordance with an instruction from the control unit 101, calculation processes are parallelly executed in respective shooting operations during continuous shooting. In other words, the defocus amount detection unit 112 simultaneously performs the calculation processes of defocus amounts that have started in accordance with instructions from the control unit 101 in a plurality of shooting operations during continuous shooting. If the calculation which has not been completed till step S306 in one shooting operation has been completed in a succeeding shooting operation during continuous shooting, the defocus amount detection unit 112 outputs, for example, the calculated defocus amounts to the control unit 101 via the focus detection unit 111. The control unit 101 may store, in, for example, the ROM 102 as the latest defocus amounts, the calculated defocus amounts which have been output from the defocus amount detection unit 112 via the focus detection unit 111. At this time, the control unit 101, for example, forcibly ends the calculation processing of defocus amounts in a shooting operation that precede those stored as the latest defocus amounts in the ROM 102, out of defocus amounts in other shooting operations during continuous shooting that are simultaneously calculated by the defocus amount detection unit 112. Whether calculation processing in a shooting operation precedes that of the latest defocus amounts may be determined as follows when the control unit 101 instructs the defocus amount detection unit 112 to start calculating defocus amounts. When, for example, instructing the defocus amount detection unit 112 to start calculating defocus amounts, the control unit 101 refers to the value of the built-in timer (not shown) of the digital camera 100 and inputs the timer value as a permanent parameter in calculation processing. After determining the latest defocus amounts, the control unit 101 compares the timer value of calculation processing in which the latest defocus amounts have been detected, with that of calculation processing which is parallelly executed now, thereby determining whether calculation processing in a shooting operation precedes that of the latest defocus amounts. The control unit 101 can refer to the latest defocus amounts because the ROM 102 always stores, as the latest defocus amounts, defocus amounts, calculation of which has been completed by the defocus amount detection unit 112 in a shooting operation preceding the current one.

Similarly, when storing, in the ROM 102, reliabilities determined by the focus detection unit 111 in S307, information of the reliabilities is also stored in association with a built-in timer value at the start of calculating defocus amounts in S305. When storing the calculated defocus amounts as the latest ones in the ROM 102, the control unit 101 suffices to associate, with the latest defocus amounts, reliabilities which are associated with the same built-in timer value as that at the start of calculating the latest defocus amounts. When recording the latest defocus amounts, the control unit 101 suffices to delete, from the ROM 102, information of the reliabilities associated with a value before the built-in timer value at the start of calculating the latest defocus amounts. When acquiring the latest defocus amounts, the control unit 101 can also acquire information of reliabilities upon detecting the defocus amounts.

The control unit 101 instructs the weighting calculation unit 113 to determine the weightings of the respective focus detection areas, based on the latest defocus amounts which have been read out from the ROM 102 and output, and information of reliabilities upon detecting the latest defocus amounts. The control unit 101 stores, in the ROM 102, information of the weightings determined by the weighting calculation unit 113, and information of the defocus amounts and reliabilities used to determine the weightings. The control unit 101 then shifts the process to step S313.

If the control unit 101 determines in step S310 that there is no defocus amount, calculation of which has been started by the defocus amount detection unit 112 after the focusing operation and completed in a shooting operation preceding the current one, it shifts the process to step S312. In step S312, the control unit 101 instructs the weighting calculation unit 113 to determine weightings so as to weight the central photometry area regardless of information of the reliabilities output from the focus detection unit 111. As the weightings to weight the central photometry area, the weighting is set to, for example, 1 in the photometry area AE44 in FIG. 2B and 0.75 in the remaining photometry area. The control unit 101 stores, in the ROM 102, weightings determined by the weighting calculation unit 113. The control unit 101 can therefore determine an exposure mainly using a photometric value at the center in a step to be described later. After determining weightings to weight the central photometry area, the control unit 101 shifts the process to step S313.

In step S313, the control unit 101 outputs, to the exposure calculation unit 114, the weightings stored in the ROM 102, and the photometric values of photometry areas corresponding to the focus detection areas, out of the photometric values obtained by the photometry unit 106. The control unit 101 instructs the exposure calculation unit 114 to determine an exposure (exposure determination). In accordance with the instruction from the control unit 101, the exposure calculation unit 114 calculates the weighted average of the photometric values of photometry areas corresponding to the focus detection areas by using the weightings. The exposure calculation unit 114 sets the calculated average photometric value as the weighted average photometric value of all the areas. Then, the exposure calculation unit 114 determines a correct exposure based on the weighted average photometric value, and transmits it to the control unit 101.

In step S314, the control unit 101 determines an aperture value and shutter speed in accordance with information of the correct exposure output from the exposure calculation unit 114. The control unit 101 reads out, from image sensing settings stored in, for example, the ROM 102, information indicating which of aperture value-priority exposure and shutter speed-priority exposure is set. The control unit 101 determines an aperture value and shutter speed based on the exposure. More specifically, when aperture value-priority exposure is set in image sensing settings stored in the ROM 102, the control unit 101 derives a shutter speed from the exposure based on a preset aperture value. When shutter speed-priority exposure is set in image sensing settings stored in the ROM 102, the control unit 101 derives an aperture value from the exposure based on a preset shutter speed. The control unit 101 transmits the determined aperture value and shutter speed to the lens driving unit 115 and shutter control unit 116, respectively. The lens driving unit 115 and shutter control unit 116 control the aperture and shutter of the optical system 104. After that, a recording image is sensed.

In step S315, the control unit 101 instructs the image sensing unit 105 to photoelectrically convert light which has entered the digital camera 100 via the optical system 104 at the determined aperture value and shutter speed, and the A/D converter 107 to A/D-convert the optical signal, obtaining a recording digital image. Further, the control unit 101 instructs the image processing unit 108 to apply predetermined image processing to the recording digital image in accordance with recording image settings stored in, for example, the ROM 102. The control unit 101 transmits the obtained recording image to the recoding medium 109, and records it. Upon completion of this processing, the control unit 101 determines that one shooting operation during continuous shooting has ended, and shifts the process to step S316.

In step S316, the control unit 101 determines whether to continue or end continuous shooting, by determining whether the input from the user to the release button of the operation input unit 103 continues. If the input from the user to the release button of the operation input unit 103 continues, the control unit 101 determines not to end continuous shooting, and shifts the process to step S303 to perform the next successive shooting operation. If there is no input from the user to the release button of the operation input unit 103, the control unit 101 determines that continuous shooting has ended, and ends the continuous shooting processing.

As described above, the image sensing apparatus in the embodiment detects defocus amounts and their reliabilities from information of a plurality of focus detection areas of an object image in continuous shooting processing. The image sensing apparatus determines the weightings of the respective photometry areas to increase the weighting for a photometry area corresponding to a focus detection area where the detected reliability is high and the defocus amount is small. When the weightings can be determined based on the defocus amounts and reliabilities, the image sensing apparatus calculates the weighted average of photometric values obtained in a plurality of photometry areas by using the weightings, thereby determining a correct exposure in image sensing. If the calculation of defocus amounts after the focusing operation has not been completed and no weighting can be determined in one shooting operation during continuous shooting, the image sensing apparatus determines weightings using the latest ones of defocus amounts calculated after the focusing operation in a shooting operation preceding the current one during continuous shooting. If there is no defocus amount calculated after the focusing operation in a shooting operation preceding the current one, the image sensing apparatus determines weightings so as to weight a photometry area corresponding to the central area of the object image.

Hence, even if the continuous shooting speed is high and the calculation of defocus amounts after the focusing operation has not been completed in one shooting operation during continuous shooting, the image sensing apparatus can sense an image with a correct exposure. The image sensing apparatus can therefore achieve continuous shooting with a correct exposure without decreasing the continuous shooting speed in continuous shooting. In addition, the image sensing apparatus can suppress variations in exposure between images obtained in successive shooting operations during continuous shooting.

In the embodiment, the weighting is determined using the defocus amount and its reliability. However, the weighting may be determined without using the reliability of the defocus amount. In step S312, weightings are determined to weight the central photometry area. Alternatively, weightings may be determined to weight a photometry area corresponding to a focus detection area at a predetermined position of the field that is selected by a user input to the operation input unit 103.

(Modification 1)

Figure 4:
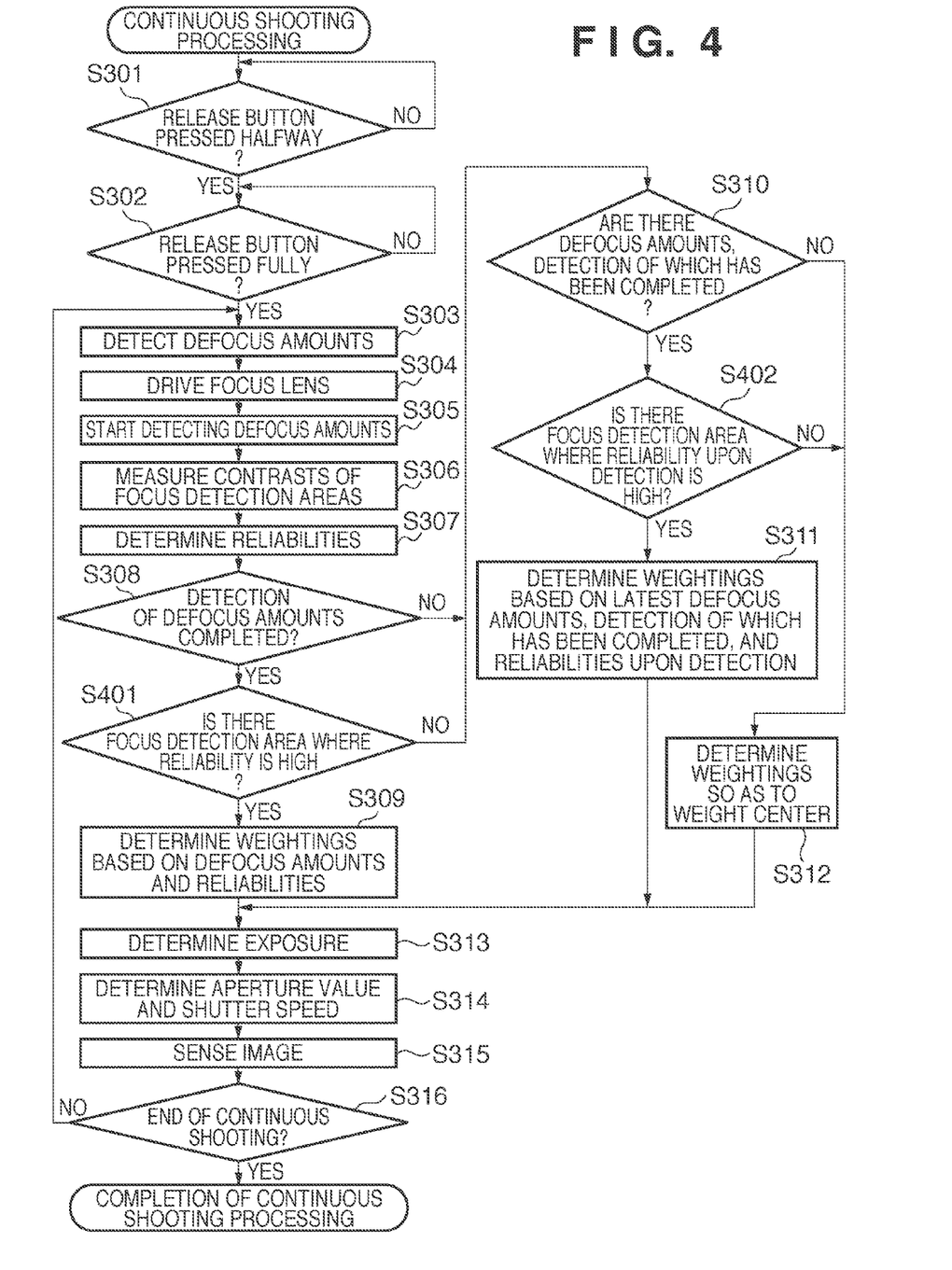
FIG. 4 is a flowchart for explaining continuous shooting processing in the image sensing apparatus according to Modification 1.

Modification 1 of continuous shooting processing in the digital camera having the foregoing arrangement will be explained with reference to the flowchart of FIG. 4. In continuous shooting processing of Modification 1, the same reference numerals as those in FIG. 3 denote steps of performing the same processes as those in the above-described embodiment, and a description thereof will not be repeated. Only characteristic steps of Modification 1 will be described.

If the control unit 101 determines in step S308 that the calculation of defocus amounts after the focusing operation that has been started by the defocus amount detection unit 112 has been completed, it shifts the process to step S401. In step S401, the control unit 101 determines whether information of the reliabilities of a plurality of focus detection areas, which has been output from the focus detection unit 111 to the weighting calculation unit 113, indicates a focus detection area where the reliability is high. When, for example, the threshold is set to 75%, a focus detection area where the reliability is high is one where the reliability is higher than 75%. If at least one focus detection area where the reliability is high exists in a plurality of focus detection areas, the control unit 101 shifts the process to step S309. If there is no focus detection area where the reliability is high, the control unit 101 shifts the process to step S310.

If the control unit 101 determines in step S310 that there are defocus amounts, calculation of which has been started by the defocus amount detection unit 112 after the focusing operation and completed in a shooting operation preceding the current one, it shifts the process to step S402. In step S402, the control unit 101 reads out, from the ROM 102, reliabilities upon detecting the latest ones of the calculated defocus amounts. Then, the control unit 101 determines whether there is at least one focus detection area where the reliability upon detection is high. The subsequent processes are the same as those in FIG. 3, and a description thereof will not be repeated.

As described above, the image sensing apparatus in Modification 1 detects defocus amounts and their reliabilities from information of a plurality of focus detection areas of an object image in continuous shooting processing. The image sensing apparatus determines a weighting of each of the plurality of photometry areas to increase the weighting for a photometry area corresponding to a focus detection area where the detected reliability is high and the defocus amount is small. At this time, even when the calculation of defocus amounts after the focusing operation is completed and the weightings can be determined using the calculated defocus amounts, if a focus detection area where the detected reliability is high does not exist in the focus detection areas, the image sensing apparatus does not determine weightings using the calculated defocus amounts. Instead, the image sensing apparatus calculates weightings using defocus amounts detected in a shooting operation preceding the current one during continuous shooting, and uses them to derive an exposure.

Since the image sensing apparatus does not determine weightings using low-reliability defocus amounts, it can suppress execution of exposure control based on a weighted average photometric value using improper weightings. Even if the reliabilities of calculated defocus amounts are low, the image sensing apparatus can obtain a correct exposure.

(Modification 2)

Figure 5:
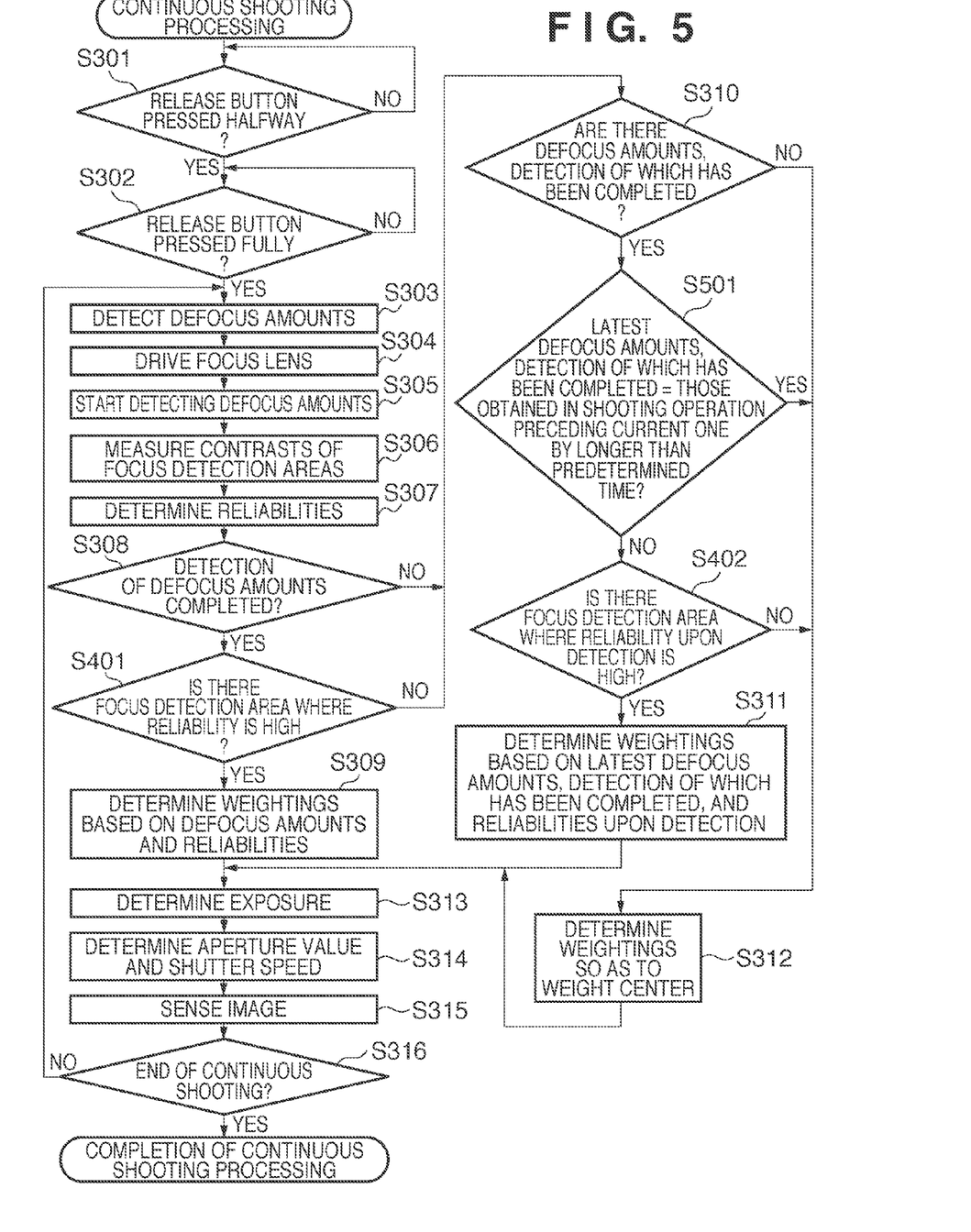
FIG. 5 is a flowchart for explaining continuous shooting processing in the image sensing apparatus according to Modification 2.

Modification 2 of continuous shooting processing in the digital camera having the foregoing arrangement will be described with reference to the flowchart of FIG. 5. In continuous shooting processing of Modification 2, the same reference numerals as those in FIGS. 3 and 4 denote steps of performing the same processes as those in the above-described embodiment and Modification 1, and a description thereof will not be repeated. Only characteristic steps of Modification 2 will be described.

If the control unit 101 determines in step S310 that there are defocus amounts, calculation of which has been started by the defocus amount detection unit 112 after the focusing operation and completed in a shooting operation preceding the current one, it shifts the process to step S501. In step S501, the control unit 101 reads out defocus amounts calculated in the latest shooting operation among those, calculation of which has been started by the defocus amount detection unit 112 and completed in shooting operations preceding the current one. At this time, the control unit 101 determines whether the latest defocus amounts have been calculated in a shooting operation preceding the current one by longer than a predetermined time. Whether the latest defocus amounts have been calculated in a shooting operation preceding the current one by longer than a predetermined time is determined, for example, as follows. When instructing the defocus amount detection unit 112 to start calculating defocus amounts, the control unit 101 transmits the value of the built-in timer of the digital camera 100 as a permanent parameter of calculation processing. Upon completion of the calculation, the control unit 101 stores, in the ROM 102, the latest defocus amounts and a built-in timer value at the start of calculating the latest defocus amounts. By referring to the built-in timer value at the start of calculating the latest defocus amounts that is stored in the ROM 102, the control unit 101 can determine whether the latest defocus amounts stored in the ROM 102 are those calculated in a shooting operation preceding the current one by longer than a predetermined time.

If the control unit 101 determines in step S501 that the latest defocus amounts have been calculated in a shooting operation preceding the current one by longer than the predetermined time, it shifts the process to step S312. If the latest defocus amounts have been calculated in a shooting operation preceding the current one within the predetermined time, the control unit 101 shifts the process to step S402. The subsequent processes are the same as those in FIG. 4, and a description thereof will not be repeated.

As described above, the image sensing apparatus in Modification 2 detects reliabilities proportional to contrasts, and defocus amounts from information of a plurality of focus detection areas of an object image in continuous shooting processing. For each of the plurality of focus detection areas of the object image, the image sensing apparatus determines weightings which are proportional to the reliabilities and inversely proportional to the defocus amounts. If the detection of defocus amounts is not completed and no weighting can be determined in one shooting operation during continuous shooting, the image sensing apparatus determines weightings using the latest ones of defocus amounts detected in shooting operations preceding the current one during continuous shooting. Even when the detection of defocus amounts is completed and the weightings can be determined in one shooting operation, if a focus detection area where the reliability is high does not exist in the focus detection areas, the image sensing apparatus determines weightings using the latest ones of defocus amounts detected in shooting operations preceding the current one. At this time, if the latest ones of defocus amounts detected in shooting operations preceding the current one are defocus amounts detected in a shooting operation preceding the current one by longer than a predetermined time, the image sensing apparatus does not use the latest defocus amounts. Instead, the image sensing apparatus determines weightings so as to weight a focus detection area corresponding to the central area of the object image.

When the object state changes with the lapse of time during continuous shooting, the image sensing apparatus determines weightings based on defocus amounts obtained before the change of the state. The image sensing apparatus can suppress execution of image sensing with an exposure not suited to the state, and can sense an image with a correct exposure.

Note that Modification 2 has described steps including a conditional branch when a focus detection area where the reliability is high does not exist in focus detection areas even if detection of defocus amounts has been completed and the weightings can be determined in one shooting operation, as described in Modification 1. However, the present invention need not include the conditional branch when a focus detection area where the reliability is high does not exist in focus detection areas even if detection of defocus amounts has been completed and the weightings can be determined in one shooting operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-201091, filed Aug. 31, 2009, which is hereby incorporated by reference herein in its entirety.

What is claimed is:

1. An image sensing apparatus capable of continuous shooting, comprising:
   a defocus amount detection unit which detects a defocus amount in each of a plurality of focus detection areas in every shooting operation during continuous shooting;
   a photometry unit which has a plurality of photometry areas corresponding to the plurality of focus detection areas and performs photometry in each of the plurality of photometry areas in every shooting operation during continuous shooting;
   a weighting unit which determines a weighting of each of the plurality of photometry areas based on defocus amounts detected by the defocus amount detection unit; and
   an exposure determination unit which determines an exposure for image sensing in every shooting operation during continuous shooting,
   wherein in one shooting operation during continuous shooting,
   when the weighting unit can determine weightings of the plurality of photometry areas till a next successive shooting operation, the exposure determination unit determines the exposure by calculating a weighted average of photometric values of the plurality of photometry areas using the weightings determined by the weighting unit, and
   when the weighting unit cannot determine the weightings of the plurality of photometry areas till the next successive shooting operation, the exposure determination unit determines the exposure by calculating a weighted average of the photometric values of the plurality of photometry areas using weightings which have been determined by the weighting unit in a shooting operation preceding the one shooting operation.

2. The apparatus according to claim 1, further comprising a reliability determination unit which determines a reliability of the defocus amount of each of the plurality of focus detection areas,
   wherein the weighting unit determines the weighting of each of the plurality of photometry areas based on the defocus amount and the reliability of a focus detection area corresponding to each of the plurality of photometry areas.

3. The apparatus according to claim 2, wherein when the weighting unit can determine the weightings of the plurality of photometry areas till a next successive shooting operation in one shooting operation during continuous shooting,
   if a focus detection area where a reliability determined by the reliability determination unit is higher than a predetermined threshold exists in the plurality of focus detection areas, the exposure determination unit determines the exposure by calculating a weighted average of photometric values of the plurality of photometry areas using the weightings determined by the weighting unit, and
   if a focus detection area where a reliability determined by the reliability determination unit is higher than the threshold does not exist in the plurality of focus detection areas, the exposure determination unit determines the exposure by calculating a weighted average of the photometric values of the plurality of photometry areas using weightings which have been determined by the weighting unit in a shooting operation preceding the one shooting operation.

4. The apparatus according to claim 1, wherein when the weightings which have been determined by the weighting unit in the preceding shooting operation are used to determine the exposure, and the weightings have been determined by the weighting unit in a shooting operation preceding by longer than a predetermined time, the exposure determination unit determines the exposure by calculating a weighted average of the photometric values of the plurality of photometry areas using weightings which weight a predetermined photometry area of a field.

5. The apparatus according to claim 1, wherein when the weighting unit has not determined weightings in the preceding shooting operation, the exposure determination unit determines the exposure by calculating a weighted average of the photometric values of the plurality of photometry areas using weightings which weight a photometry area at a predetermined position of a field.

6. A method of controlling an image sensing apparatus capable of continuous shooting, the method comprising:
   a detecting step detects a defocus amount in each of a plurality of focus detection areas in every shooting operation during continuous shooting;
   a photometry step performs photometry in each of a plurality of photometry areas corresponding to the plurality of focus detection areas in every shooting operation during continuous shooting;
   a weighting step determines a weighting of each of the plurality of photometry areas based on defocus amounts detected in the detecting step; and
   a determining exposure step determines an exposure for image sensing in every shooting operation during continuous shooting,
   wherein in the determining exposure step, in one shooting operation during continuous shooting,
   when weightings of the plurality of photometry areas can be determined in the weighting step till a next successive shooting operation, the exposure is determined by calculating a weighted average of photometric values of the plurality of photometry areas using the weightings determined in the weighting step, and
   when the weightings of the plurality of photometry areas cannot be determined in the weighting step till the next successive shooting operation, the exposure is determined by calculating a weighted average of the photometric values of the plurality of photometry areas using weightings which have been determined in the weighting step in a shooting operation preceding the one shooting operation.

* * * * *